US011760184B2

United States Patent
Oshida et al.

(10) Patent No.: US 11,760,184 B2
(45) Date of Patent: Sep. 19, 2023

(54) HYBRID VEHICLE COOLING SYSTEM FOR POWERTRAIN COMPONENTS

(71) Applicant: Mazda Motor Corporation, Hiroshima (JP)

(72) Inventors: Manabu Oshida, Hiroshima (JP); Hideaki Uchise, Hiroshima (JP); Yuya Fujiwara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 97 days.

(21) Appl. No.: 17/500,953

(22) Filed: Oct. 14, 2021

(65) Prior Publication Data
US 2022/0126671 A1 Apr. 28, 2022

(30) Foreign Application Priority Data
Oct. 22, 2020 (JP) .................. 2020-177369

(51) Int. Cl.
| | |
|---|---|
| *B60K 1/04* | (2019.01) |
| *B60K 6/28* | (2007.10) |
| *B60K 6/40* | (2007.10) |
| *B60K 13/04* | (2006.01) |
| *B62D 25/20* | (2006.01) |

(Continued)

(52) U.S. Cl.
CPC .............. *B60K 1/04* (2013.01); *B60K 6/28* (2013.01); *B60K 6/40* (2013.01); *B60K 6/50* (2013.01); *B60K 11/00* (2013.01); *B60K 11/02* (2013.01); *B60K 13/04* (2013.01); *B62D 25/2045* (2013.01); *H02K 5/203* (2021.01); *B60K 2001/0438* (2013.01);

(Continued)

(58) Field of Classification Search
CPC .......... B60K 6/40; B60K 11/00; B60K 11/02; B60K 6/26; B60K 6/20; B60K 2006/4825; B60K 6/50; B60Y 2400/61; B60Y 2306/05; H02K 5/203
See application file for complete search history.

(56) References Cited

U.S. PATENT DOCUMENTS 5,508,924 A * 4/1996 Yamashita ............... B60L 3/102
  701/91
5,856,709 A * 1/1999 Ibaraki .................. B60W 10/08
  475/5

(Continued)

FOREIGN PATENT DOCUMENTS

| | | |
|---|---|---|
| JP | 2001-260674 A | 9/2001 |
| JP | 2011-525348 A | 9/2011 |

*Primary Examiner* — Jason D Shanske
*Assistant Examiner* — James J Triggs
(74) *Attorney, Agent, or Firm* — XSENSUS LLP

(57) ABSTRACT

A pipe connection portion of a damper case has an opening opened toward the rear side. In an end surface around the opening in the pipe connection portion, a recess is formed in an inner diameter portion. The recess is recessed to the front side as compared to another portion of the end surface. In an end surface of a pipe member, a groove portion is formed in an outer diameter portion. The groove portion is recessed to the rear side as compared to another portion of the end surface. A first seal member and a second seal member are interposed between the end surface of the damper case and the end surface of the pipe member, and the damper case and the pipe member are sealed by the seal members in a liquid-tight manner.

20 Claims, 10 Drawing Sheets

(51) Int. Cl.
   *B60K 6/50*     (2007.10)
   *B60K 11/00*    (2006.01)
   *B60K 11/02*    (2006.01)
   *H02K 5/20*     (2006.01)
   *B60K 6/48*     (2007.10)

(52) U.S. Cl.
   CPC ... *B60K 2006/4825* (2013.01); *B60Y 2306/05* (2013.01); *B60Y 2400/61* (2013.01)

(56) References Cited

U.S. PATENT DOCUMENTS

| | | | | |
|---|---|---|---|---|
| 5,903,061 | A * | 5/1999 | Tsuzuki | B60W 10/08 |
| | | | | 903/910 |
| 5,934,395 | A * | 8/1999 | Koide | F02N 11/04 |
| | | | | 903/905 |
| 6,048,288 | A * | 4/2000 | Tsujii | B60W 10/30 |
| | | | | 903/910 |
| 6,666,289 | B2 * | 12/2003 | Shimizu | B60K 6/485 |
| | | | | 903/951 |
| 6,701,229 | B2 * | 3/2004 | Iwasaki | B60K 6/46 |
| | | | | 477/3 |
| 6,715,591 | B2 * | 4/2004 | Davis | F16F 9/56 |
| | | | | 188/266.2 |
| 11,390,154 | B2 * | 7/2022 | McBride | B60K 6/40 |
| 2001/0024994 | A1 | 9/2001 | Sugano | |
| 2011/0095634 | A1 * | 4/2011 | Lamke | H02K 7/006 |
| | | | | 310/91 |

\* cited by examiner

US 11,760,184 B2

HYBRID VEHICLE COOLING SYSTEM FOR POWERTRAIN COMPONENTS

CROSS-REFERENCE TO RELATED APPLICATION

The present application claims priority to Japanese Patent Application 2020-177369, filed Oct. 22, 2020, the entire contents of which are incorporated herein by reference.

BACKGROUND

Field

The present disclosure relates to a vehicle, and particularly to a vehicle including an engine and a motor serving as driving sources for vehicle traveling.

Description of the Related Art

In recent years, hybrid vehicles including a motor in addition to an engine as driving sources for vehicle traveling have been becoming popular for the purpose of reduction of environmental load and the like. The motor serving as the driving source for vehicle traveling needs to be cooled by coolant such as water because heat generation at the time of driving is high.

In Patent Literature 1, a structure in which a motor is provided in a transmission case of a transmission is disclosed. Two pipes are connected to a ring-shaped stator support body that supports a stator of the motor. The two pipes are pipes for circulating coolant for cooling the motor.

In the motor, there is oil in a motor case. Therefore, when a pipe for circulating the coolant is to be connected to the inside of the motor case, a double-seal structure needs to be employed.

In Patent Literature 2, a structure for connecting flow passages of oil to each other between a control valve unit and an oil pump is disclosed. In the structure of Patent Literature 2, two ring grooves provided to be spaced apart from each other in the radial direction are formed in a surface of the oil pump to be connected with a control valve. An O-ring is fitted in each of the ring grooves.

CITATION LIST

Patent Literature

[Patent Literature 1] Japanese Translation of PCT International Application Publication No. 2011-525348
[Patent Literature 2] Japanese Patent Laid-Open No. 2001-260674

SUMMARY

Technical Problems

Incidentally, as a vehicle including an engine and a motor as driving sources for vehicle traveling, a structure in which the engine, a damper (a device for mitigating an impact torque between the engine and the motor), and the motor are disposed in the stated order from the vehicle front side may be employed. When a structure as above is to be employed, the motor is disposed in an entrance portion of a floor tunnel, and hence a flow passage for introducing the coolant to the motor needs to be provided so as to be connected to a motor-case front end portion of the motor through the inside of a damper case of the damper.

In other words, when a coolant pipe is to be connected to a side portion of the motor case, the pipe and a fastening member used to connect the pipe protrude to the side of the motor case. In a structure as above, the fastening member and the like are positioned on the front side of the feet of an occupant, and it is difficult to employ the structure as above from the viewpoint of ensuring safety of the occupant at the time of a front collision of the vehicle.

When the coolant is introduced from the damper case and the coolant is guided to the motor, one end of the coolant pipe needs to be connected to a coolant channel (in-damper channel) that is provided in the damper case and extends in the vehicle front-rear direction, and the other end of the coolant pipe needs to be connected to the motor. In this case, the coolant pipe including a portion connected to the damper case is disposed in the motor case in which oil exists. In the structure above, a double-seal structure needs to be employed as disclosed in Patent Literature 2 described above, but a partition wall needs to be provided between seal members.

However, when a partition wall is to be provided between the seal members in the connection portion between the damper case and the coolant pipe, the size of the connection portion increases in the vehicle width direction by the size of the partition wall, and the connection portion protrudes to the side. Therefore, it is also difficult to employ a structure in which a partition wall is provided between the seal members in the connection portion between the damper case and the coolant pipe from the viewpoint of ensuring safety of the occupant at the time of a front collision of the vehicle.

The present disclosure has been made in order to solve the problems as described above, and an object thereof is to provide a vehicle in which the size of a connection portion between a damper case and a coolant pipe in the vehicle width direction can be reduced in a structure in which coolant is guided to the motor from the damper case, a large indoor space can be realized, and high collision safety can be ensured.

Means for Solving the Problems

A vehicle according to one aspect of the present disclosure includes a longitudinal engine having a plurality of cylinders, the plurality of cylinders being installed so as to be arranged in a vehicle front-rear direction, a motor disposed on a rear side with respect to the longitudinal engine in the vehicle front-rear direction and capable of generating a driving force for vehicle traveling, a damper that is provided between the longitudinal engine and the motor in the vehicle front-rear direction and mitigates an impact torque between the longitudinal engine and the motor, and a coolant channel for causing coolant for cooling the motor to circulate in the motor.

The damper includes a damper case that accommodates a torque mitigation mechanism that mitigates the impact torque, and the motor includes a motor case that accommodates a rotor, a stator, and lubricant oil. The coolant channel includes an in-damper channel for circulating the coolant in the damper case, an in-motor channel for circulating the coolant in a state of being separated from the lubricant oil in the motor case, and a coolant pipe that connects a coolant outlet in the in-damper channel and a coolant inlet in the in-motor channel to each other in the motor case.

The in-damper channel is provided such that a predetermined region leading to the coolant outlet extends in a first direction along the vehicle front-rear direction, a pipe end surface of the coolant pipe and an outlet end surface of the coolant outlet face each other in a connection portion between the coolant pipe and the coolant outlet, and a first seal member and a second seal member, which are each provided in a ring shape so as to surround the channel of the coolant and of which diameters are different from each other, are interposed in a liquid-tight manner between the pipe end surface and the outlet end surface in the first direction. A first end surface that is one of the pipe end surface and the outlet end surface has a first recess having a ring shape and recessed toward the first direction as compared to another portion of the first end surface, and a second end surface that is the other of the pipe end surface and the outlet end surface has, in a portion on an inner side with respect to the first recess, a second recess having a ring shape and recessed toward the first direction as compared to another portion of the second end surface, the first seal member seals a bottom surface of the first recess and the other portion of the second end surface to each other in a liquid-tight manner, and the second seal member seals a bottom surface of the second recess and the other portion of the first end surface to each other in a liquid-tight manner.

The vehicle according to the abovementioned aspect is configured such that the coolant is introduced into the motor from the in-damper channel through the coolant pipe. Therefore, as compared to a case where the coolant is directly introduced to the motor case in the motor, an increase in the dimension of the motor in the vehicle width direction can be suppressed.

In the vehicle according to the abovementioned aspect, in the connection portion between the coolant pipe and the coolant outlet in the damper case, the first recess is provided in one (first end surface) of the pipe end surface and the outlet end surface, and the second recess is provided in the other (second end surface) of the pipe end surface and the outlet end surface. The first seal member is disposed in a portion at which the bottom surface of the first recess and the other portion of the second end surface face each other, and the second seal member is disposed in a portion at which the bottom surface of the second recess and the other portion of the first end surface face each other. Therefore, a high sealing property can be ensured even when a partition wall is not provided between the portion in which the first seal member is disposed and the portion in which the second seal member is disposed.

Therefore, in the vehicle according to the abovementioned aspect, the size of the connection portion between the damper case and the coolant pipe in the vehicle width direction can be reduced, a large indoor space can be realized, and high collision safety can be ensured.

In the vehicle according to the abovementioned aspect, when a direction orthogonal to the first direction is a second direction, at least one of the first recess and the second recess may be a groove portion having two side surfaces facing each other in the second direction and the bottom surface when the connection portion between the coolant pipe and the coolant outlet is cross-sectionally seen in a cross-section along the first direction.

In the vehicle according to the abovementioned aspect, at least one of the first recess and the second recess is the groove portion, and hence the seal member inserted in the groove portion is securely held in the radial direction of the coolant pipe. Therefore, a case where the seal member is deformed or moved can be suppressed even when hydraulic pressure from the coolant is applied to the seal member.

In the vehicle according to the abovementioned aspect, a gap between the pipe end surface and the outlet end surface may have a crank shape when the connection portion between the coolant pipe and the coolant outlet is cross-sectionally seen in a cross-section along the first direction.

In the vehicle according to the abovementioned aspect, the gap between the pipe end surface and the outlet end surface has a crank shape in cross-section, and hence a high sealing property can be ensured even when a partition wall is not provided between the portion in which the first seal member is disposed and the portion in which the second seal member is disposed.

In the vehicle according to the abovementioned aspect, the first end surface may have a difference in level between the first recess and the other portion in the first end surface, and the second end surface may have a difference in level between the second recess and the other portion in the second end surface.

In the vehicle according to the abovementioned aspect, in the connection portion between the coolant pipe and the coolant outlet in the damper case, a difference in level is provided between the portion in which the first seal member is disposed and the portion in which the second seal member is disposed, and hence a high sealing property can be ensured even when a partition wall is not provided between the portion in which the first seal member is disposed and the portion in which the second seal member is disposed.

In the vehicle according to the abovementioned aspect, a transmission that includes a transmission mechanism and a transmission case accommodating the transmission mechanism, is disposed so as to be adjacent to the motor on a rear side with respect to the motor in the vehicle front-rear direction, and is coupled to the motor, and an inverter that converts input direct-current power to alternating-current power and outputs the alternating-current power to the motor may be further included. In the vehicle according to the abovementioned aspect, a floor tunnel that bulges out toward an inside of a vehicle cabin and extends in the vehicle front-rear direction may be formed in a floor panel of the vehicle, the transmission may be disposed on a lower side of the floor tunnel, and the inverter may be mounted on the lower side of the floor tunnel and on an upper portion of the transmission case. In the vehicle according to the abovementioned aspect, an electrical connection portion for electrically connecting the inverter and the motor to each other may be mounted on a portion from the upper portion of the transmission case to an upper portion of the motor case, and the connection portion between the coolant pipe and the coolant outlet may be provided on a side portion in the damper case in a vehicle width direction.

In the vehicle according to the abovementioned aspect, the inverter is mounted on the upper portion of the transmission case, and the electrical connection portion is mounted on a portion from the upper portion of the transmission case to the upper portion of the motor case. In the vehicle according to the abovementioned aspect, the connection portion between the coolant pipe and the coolant outlet is provided on the side portion in the damper case in the vehicle width direction, and hence the connection portion and each of the inverter and the electrical connection portion are prevented from interfering with each other.

In the vehicle according to the abovementioned aspect, an exhaust pipe that is connected to the longitudinal engine and guides and exhausts exhaust gas exhausted from the longitudinal engine to a vehicle rear side may be further included. In the vehicle according to the abovementioned aspect, the exhaust pipe may be disposed on one side of the damper case in the vehicle width direction, and the connection portion between the coolant pipe and the coolant outlet may be provided on a side portion in the damper case in the vehicle width direction that is on a side opposite to a side on which the exhaust pipe is disposed.

In the vehicle according to the abovementioned aspect, the exhaust pipe is disposed on one side of the damper case in the vehicle width direction, and the connection portion is provided on the other side portion of the damper case in the vehicle width direction. Therefore, the exhaust pipe and the connection portion are prevented from interfering with each other.

In the vehicle according to the abovementioned aspect, the motor case may include a cover that covers a side in the vehicle width direction, the lubricant oil may be accommodated in the cover, and an entirety of the coolant pipe from the connection portion with respect to the coolant outlet in the in-damper channel to the connection portion with respect to the coolant inlet in the in-motor channel may be accommodated in the cover.

In the vehicle according to the abovementioned aspect, the entirety of the coolant pipe is accommodated in the cover of the motor case, and hence the coolant pipe does not stick out to the side of the motor case in the vehicle width direction. Therefore, it is effective for keeping the size of the motor case in the vehicle width direction to be small.

Advantages

In the vehicle according to each aspect described above, the size of the connection portion between the damper case and the coolant pipe in the vehicle width direction can be reduced in the structure in which the coolant is guided to the motor from the damper case, a large indoor space can be realized, and high collision safety can be ensured.

DESCRIPTION OF EMBODIMENTS

Figure 1:
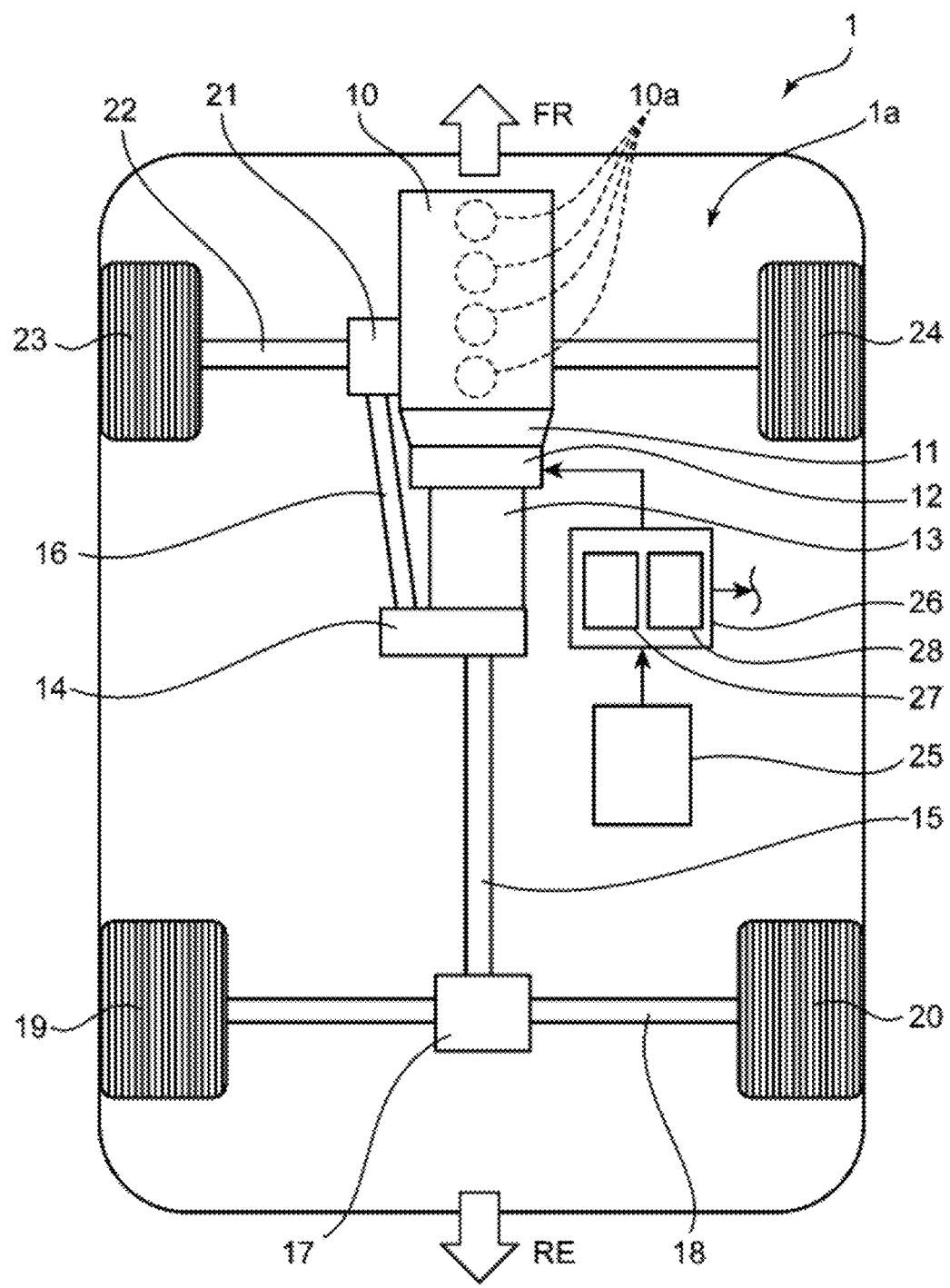
FIG. 1 is a schematic view illustrating a configuration of a vehicle according to an embodiment of the present disclosure.

An embodiment of the present disclosure is described below with reference to the drawings. Note that the form described below is one example of the present disclosure, and the present disclosure is not limited to the form below except for inherent configurations thereof.

In the drawings used in the description below, "FR" represents the vehicle front side, "RE" represents the vehicle rear side, "UP" represents the vehicle upper side, and "LO" represents the vehicle lower side".

1. Schematic Configuration of Vehicle 1

A schematic configuration of a vehicle 1 according to an embodiment of the present disclosure is described with reference to FIG. 1.

As illustrated in FIG. 1, the vehicle 1 includes an engine 10 and a motor 12 as driving sources for vehicle traveling. The engine 10 and the motor 12 are installed in an engine room 1a provided in a front portion of the vehicle 1. The engine 10 includes a plurality of cylinders 10a, and the plurality of cylinders 10a are disposed so as to line up in a longitudinal placement in the front-rear direction of the vehicle 1. In other words, the engine 10 in this embodiment is a longitudinal engine.

Note that in the vehicle 1 according to this embodiment, either a gasoline engine or a diesel engine can be employed as the engine 10.

The motor 12 is disposed on rear side with respect to the engine 10 in the front-rear direction of the vehicle 1. A rotation shaft of the motor 12 is coupled to an output shaft of the engine 10 via a damper 11. One or both of the engine 10 and the motor 12 generates a driving force for vehicle traveling in accordance with the traveling situation of the vehicle 1. Note that the damper 11 provided between the engine 10 and the motor 12 is a device for mitigating an impact torque between the engine 10 and the motor 12.

The vehicle 1 also includes a transmission 13, a transfer case 14, propeller shafts 15 and 16, differential gears 17 and 21, driveshafts 18 and 22, and wheels 19, 20, 23, and 24. The transmission 13 is coupled to the motor 12. A driving force from the engine 10 is input to the transmission 13 through the motor 12 in addition to a driving force from the motor 12. The transmission 13 provides output to the transfer case 14 by performing gear-shifting to a ratio in accordance with the traveling situation.

Note that in the vehicle 1 according to this embodiment, either a manual transmission or an automatic transmission can be employed as the transmission 13.

The transfer case 14 is a motive power splitting apparatus and is a device that splits the driving force output from the transmission 13 into a driving force to the front wheels 23 and 24 and a driving force to the rear wheels 19 and 20. A rear (R) propeller shaft 15 and a front (F) propeller shaft 16 are coupled to the transfer case 14.

Note that the ratio of the allocation of the driving force by the transfer case 14 may be sequentially changed in accordance with a road surface μ and the like.

The R propeller shaft 15 is provided so as to extend from the transfer case 14 toward the rear side in the front-rear direction of the vehicle 1. A rear end of the R propeller shaft 15 is coupled to the rear (R) differential gear 17. The rear (R)

driveshaft 18 extends from the R differential gear 17 toward both sides in the vehicle width direction. The rear wheels 19 and 20 are mounted on both ends of the R driveshaft 18.

The F propeller shaft 16 is provided so as to extend toward the front side in the front-rear direction of the vehicle 1 through the sides of the transmission 13, the motor 12, and the damper 11 in the vehicle width direction. A front end of the F propeller shaft 16 is coupled to the front (F) differential gear 21. The front (F) driveshaft 22 extends from the F differential gear 21 toward both sides in the vehicle width direction. The front wheels 23 and 24 are mounted on both ends of the F driveshaft 22.

The vehicle 1 further includes a battery 25 and an electric power conversion unit 26. The battery 25 is a battery module configured by a plurality of batteries that are lithium-ion batteries. The electric power conversion unit 26 is connected to the battery 25.

The electric power conversion unit 26 includes an inverter 27 and a DC-DC converter 28. The inverter 27 is a device that converts direct-current power input from the battery 25 into alternating-current power and outputs the alternating-current power to the motor 12. The DC-DC converter 28 is a device that converts (steps up and steps down) voltage of direct-current power input from the battery 25 and outputs the direct-current power to various loads of the vehicle 1.

2. Motor 12 and Peripheral Structure Thereof

The motor 12 and a peripheral structure thereof in the vehicle 1 are described with reference to FIG. 2 to FIG. 4.

Figure 2:
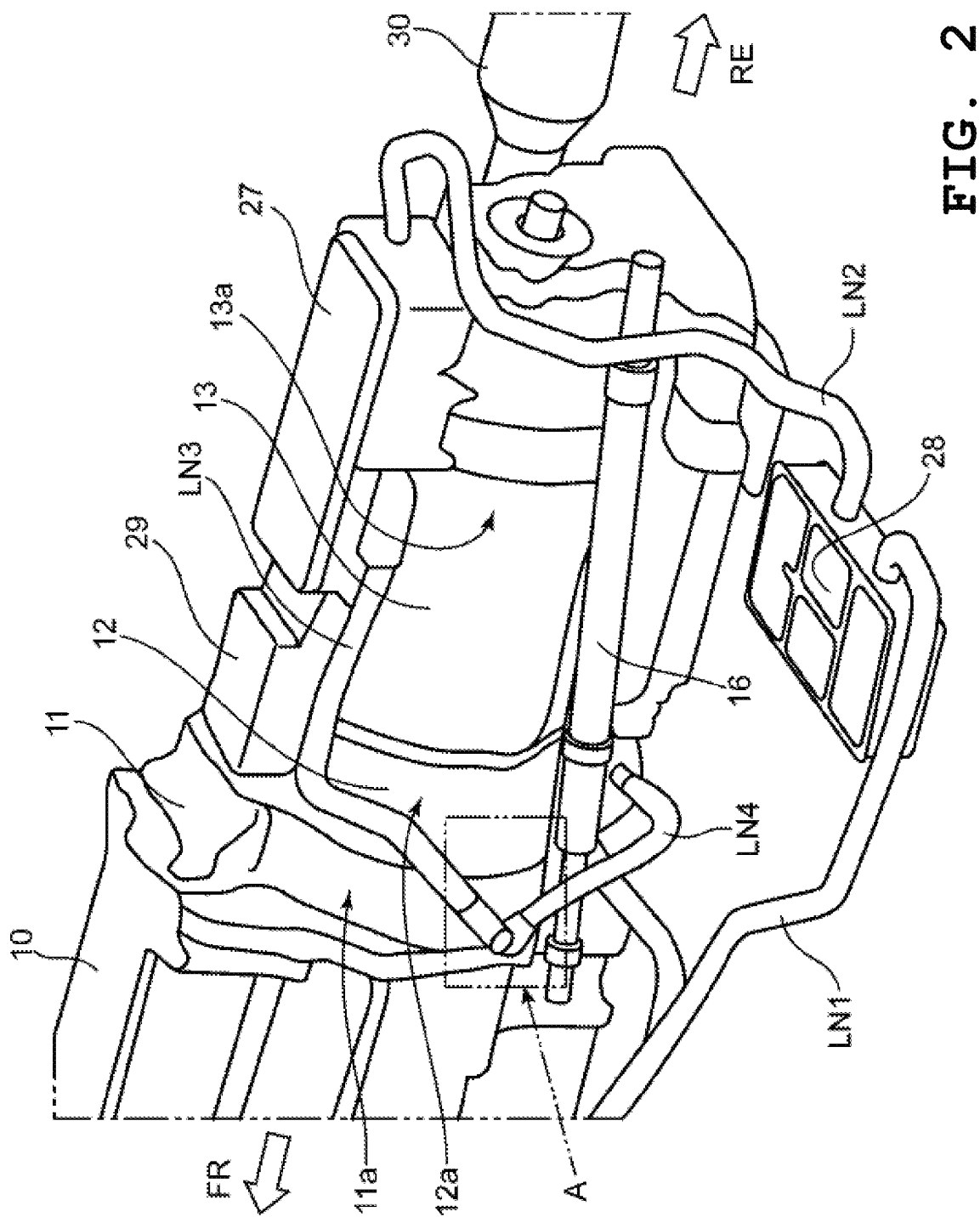
FIG. 2 is a perspective view of a motor and a peripheral configuration thereof in the vehicle seen from diagonally above.
Figure 3:
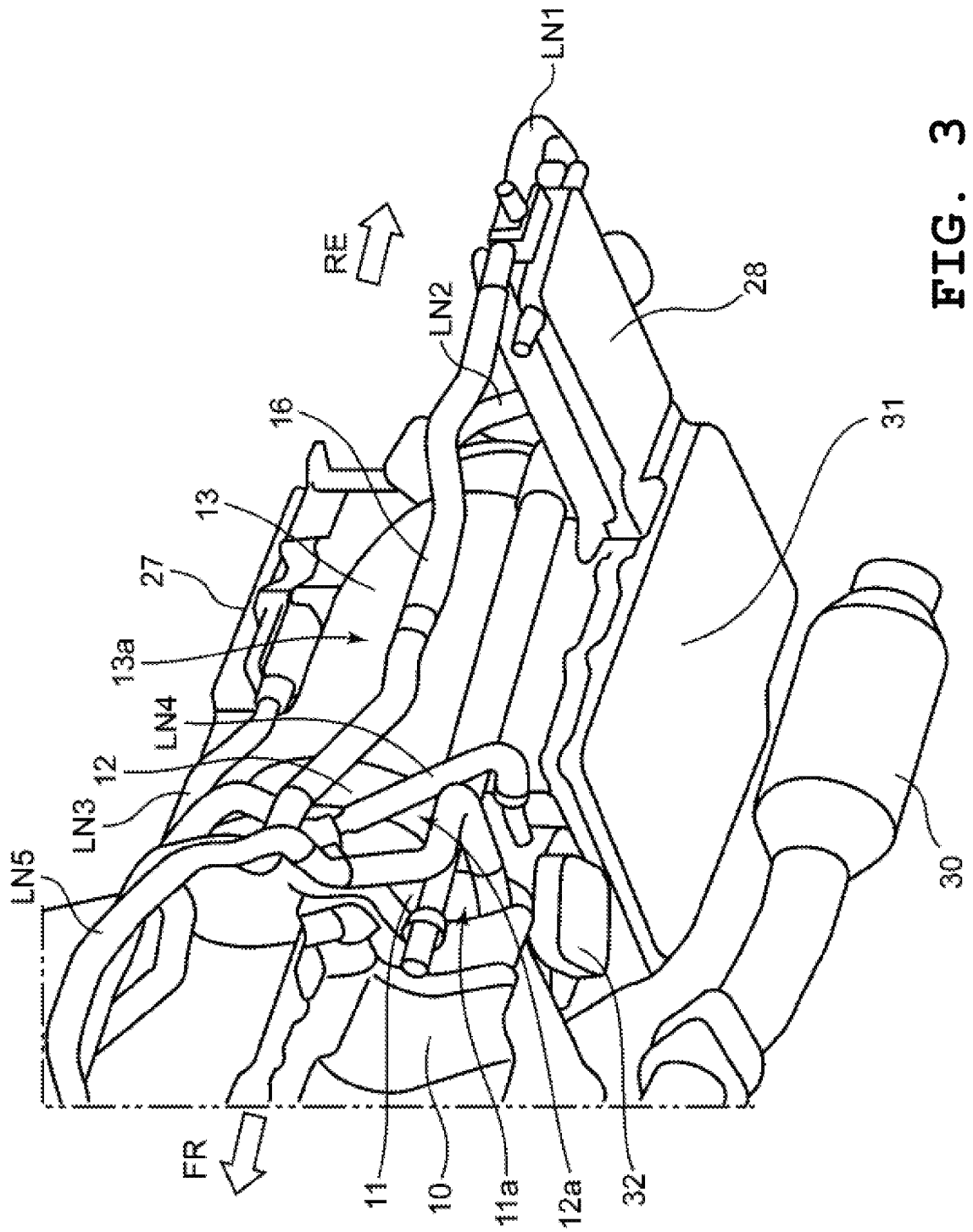
FIG. 3 is a perspective view of the motor and the peripheral configuration thereof in the vehicle seen from diagonally below.
Figure 4:
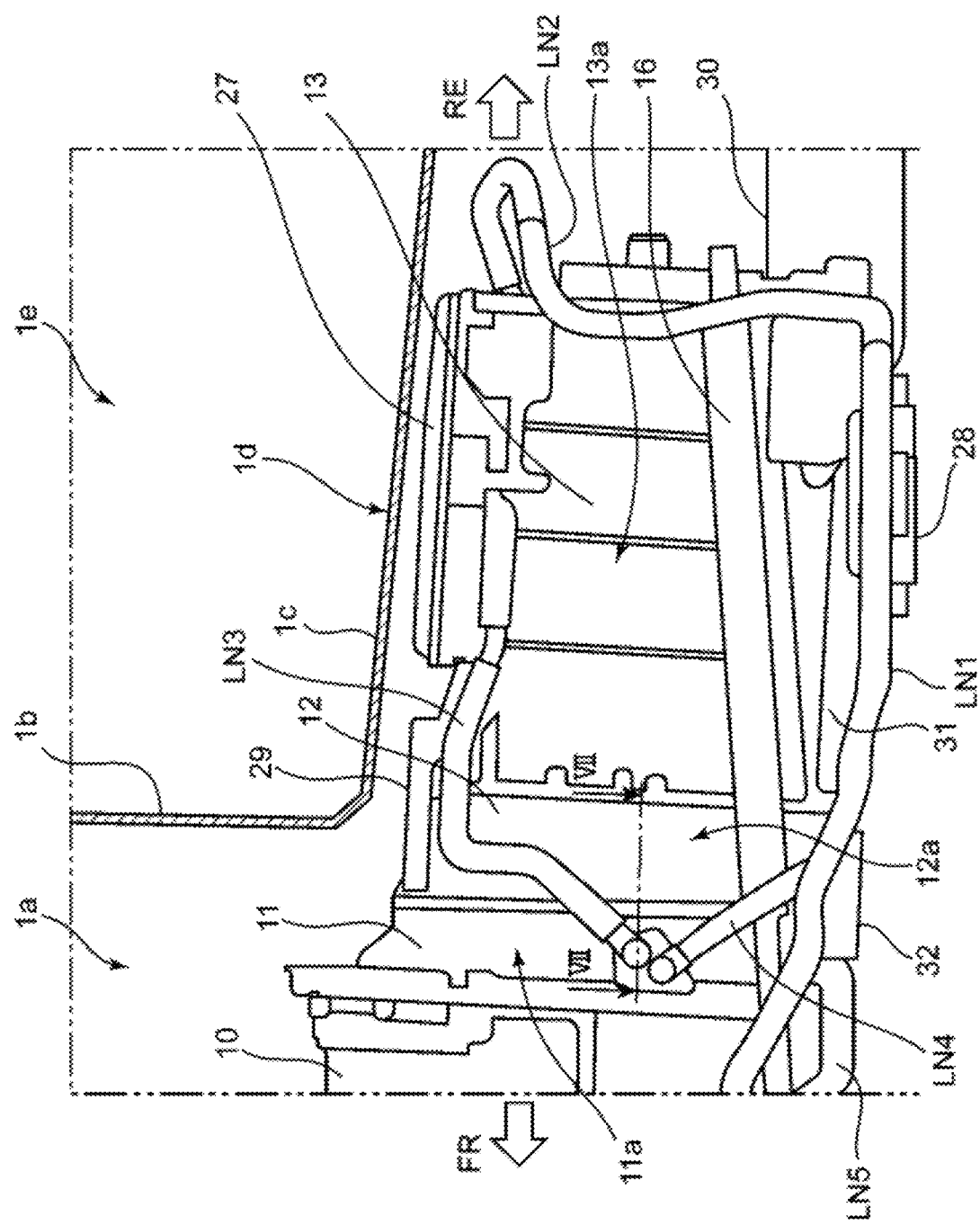
FIG. 4 is a side view of the motor and the peripheral configuration thereof in the vehicle seen from the side.

As illustrated in FIG. 2 to FIG. 4, the damper 11 includes a damper case 11a, the motor 12 includes a motor case 12a, and the transmission 13 includes a transmission case 13a. The damper case 11a is a cylindrical outer shell member and accommodates a torque mitigation mechanism that mitigates an impact torque on the inside. The motor case 12a is a cylindrical outer shell member and accommodates a rotor and a stator on the inside. The transmission case 13a is a cylindrical outer shell member that is long in the front-rear direction of the vehicle 1 and accommodates a transmission mechanism on the inside.

The inverter 27 is mounted on an upper portion of the transmission case 13a. As illustrated in FIG. 4, the transmission 13 is disposed on the lower side of a floor tunnel 1d. The inverter 27 is also disposed on the lower side of the floor tunnel 1d.

Note that, as illustrated in FIG. 4, in the vehicle 1, the engine room 1a and a vehicle cabin 1e are separated from each other by a dashboard 1b. A floor panel 1c continuous with the dashboard 1b is provided in a lower portion of the vehicle cabin 1b. The floor tunnel 1d is provided such that a part of the floor panel 1c bulges out toward the upper side (vehicle cabin 1e side) in the up-down direction of the vehicle 1 and extends toward the front-rear direction of the vehicle 1 in a central region in the vehicle width direction.

In the vehicle 1, a part of the motor 12 is also disposed on the lower side of the floor tunnel 1d.

As illustrated in FIG. 2 and FIG. 4, a terminal block 29 is mounted in a region from the upper portion of the transmission case 13a to an upper portion of the motor case 12a. The terminal block 29 is a member including a terminal and a busbar for electrically connecting the inverter 27 and the motor 12 to each other and corresponds to an electrical connection portion.

As illustrated in FIG. 2 and FIG. 3, the DC-DC converter 28 is disposed to be on the lower side with respect to a lower portion of the transmission case 13a in the up-down direction of the vehicle 1 and separated from the transmission case 13a to one (left) side in the vehicle width direction.

The F propeller shaft 16 is disposed on the left side of the damper case 11a, the motor case 12a, and the transmission case 13a in the vehicle width direction. The F propeller shaft 16 is disposed in a region closer to the transmission case 13a and the like than the DC-DC converter 28.

As illustrated in FIG. 2 and FIG. 3, an exhaust pipe 30 is disposed on the right side with respect to the damper case 11a, the motor case 12a, and the transmission case 13a in the vehicle width direction. The exhaust pipe 30 is connected to an exhaust manifold of the engine 10 and is provided so as to extend toward the rear side of the vehicle 1 in the front-rear direction.

As illustrated in FIG. 3 and FIG. 4, an oil pan 31 is mounted on the lower portion of the transmission case 13a. The oil pan 31 is a container for accumulating hydraulic oil of the transmission 13.

An oil cooler 32 is mounted in a region from a lower portion of the damper case 11a to a lower portion of the motor case 12a. The oil cooler 32 is a device for cooling lubricant oil in the motor case 12a, and is a heat exchanger that cools the lubricant oil by heat exchange with coolant described below.

3. Disposing Form of Coolant Pipes LN1 to LN8

A disposing form of the coolant pipes LN1 to LN8 in the vehicle 1 is described with reference to FIG. 2 to FIG. 5. Note that in the vehicle 1 according to this embodiment, water is employed as one example of the coolant for cooling the motor 12.

Figure 5:
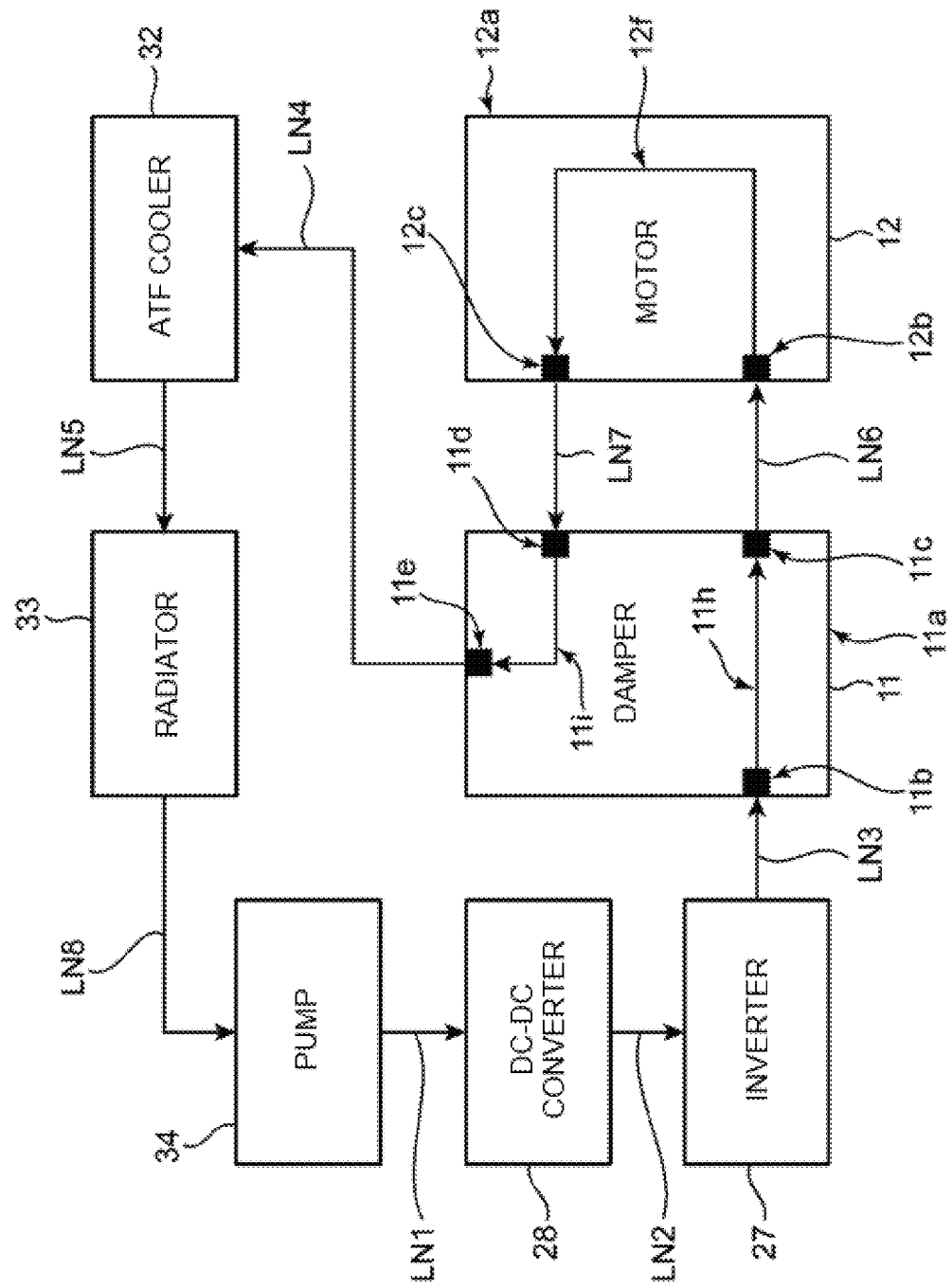
FIG. 5 is a schematic view illustrating a cooling water route in the vehicle.

The coolant pipe LN1 and the cooling pipe LN2 are connected to the DC-DC converter 28. As illustrated in FIG. 5, the coolant pipe LN1 is provided so as to connect a pump 34 for coolant and the DC-DC converter 28 to each other. The coolant pipe LN2 is provided so as to connect the DC-DC converter 28 and the inverter 27 to each other.

The coolant pipe LN3, the coolant pipe LN4, the coolant pipe LN6, and the coolant pipe LN7 are connected to the damper case 11a of the damper 11. The coolant pipe LN3 has one end connected to the inverter 27 and another end connected to a pipe connection portion lib of the damper case 11a. The coolant pipe LN6 has one end connected to a pipe connection portion 11c of the damper case 11a and another end connected to a pipe connection portion 12b of the motor case 12a in the motor 12.

In the damper case 11a, an in-damper channel 11h that connects the pipe connection portion 11b and the pipe connection portion 11c to each other is formed. The pipe connection portion 11c corresponds to a coolant outlet.

The coolant pipe LN7 has one end connected to a pipe connection portion 12c of the motor case 12a and another end connected to a pipe connection portion 11d of the damper case 11a.

In the motor case 12a, an in-motor channel 12f is provided so as to connect the pipe connection portion 12b and the pipe connection portion 12c to each other and such that the coolant circulates in the motor case 12a. The pipe connection portion 12b corresponds to a coolant inlet.

The coolant pipe LN4 has one end connected to a pipe connection portion 11e of the damper case 11a and another end connected to the oil cooler 32. In the damper case 11a, an in-damper channel 11i that connects the pipe connection portion 11d and the pipe connection portion 11e to each other is formed.

The coolant pipe LN5 is provided so as to connect the oil cooler 32 and a radiator 33 to each other. Note that in the vehicle 1 according to this embodiment, the radiator 33 is a radiator for cooling the coolant of the engine 10, and the coolant pipe LN5 is provided so as to extend to the front side of the engine 10 in the front-rear direction of the vehicle 1.

The coolant pipe LN8 is provided such that one end is connected to the radiator 33 and the other end is connected to the pump 34.

In the vehicle 1 including a circulation route of the coolant as illustrated in FIG. 5, the coolant sent out from the pump 34 passes through the DC-DC converter 28 and the inverter 27, to thereby cool the DC-DC converter 28 and the inverter 27. The coolant derived from the inverter 27 passes though the in-damper channel 11h of the damper case 11a and is sent to the in-motor channel 12f in the motor case 12a. The coolant that flows in the in-motor channel 12f cools the motor 12. The coolant derived from the motor case 12a passes through the in-damper channel 11i in the damper case 11a and is sent to the oil cooler 32.

In the oil cooler 32, the lubricant oil is cooled by heat exchange with the lubricant oil of the motor 12. Then, the coolant is sent to the radiator 33 and is cooled by heat exchange with outside air.

4. Connection Form Between Coolant Pipes LN6 and LN7 and Each of Damper Case 11a and Motor Case 12a A connection form between the coolant pipes LN6 and LN7 and each of the damper case 11a and the motor case 12a is described with reference to FIG. 6 and FIG. 7.

Figure 6A:
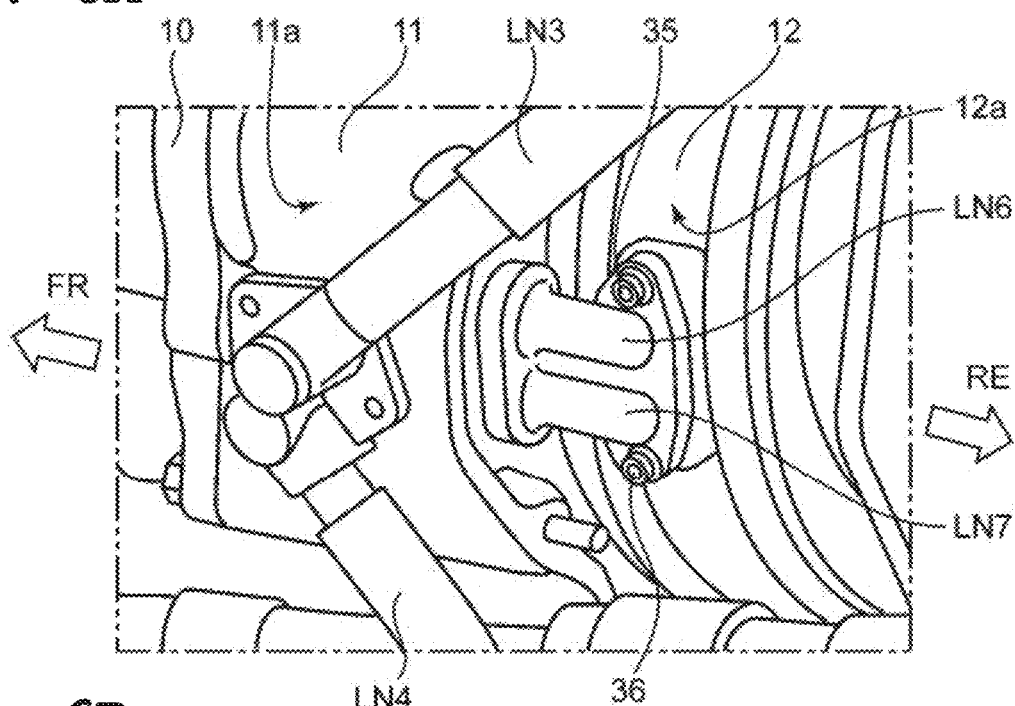
FIG. 6A is a perspective view illustrating the motor and a damper in a state in which a cover of a motor case is removed.
Figure 6B:
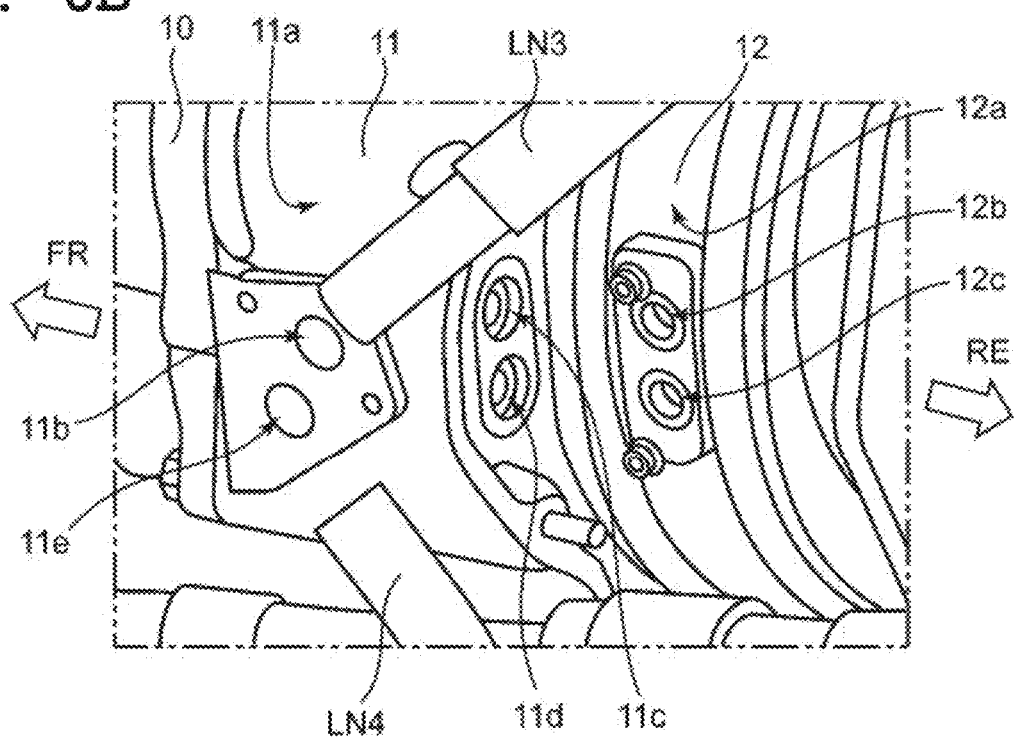
FIG. 6B is a perspective view illustrating the motor and the damper in a state in which a cooling water pipe is removed.

As illustrated in FIG. 6B, the pipe connection portions 11c and 11d in the damper case 11a are opened toward the rear side in the front-rear direction of the vehicle 1. Note that, as described above, the coolant pipes LN3 and LN4 are also connected to the damper case 11a, but the pipe connection portions 11b and 11e in the damper case 11a for the coolant pipes LN3 and LN4 are opened toward the left side in the vehicle width direction.

Meanwhile, the pipe connection portions 12b and 12c in the motor case 12a are opened toward the left side in the vehicle width direction.

As illustrated in FIG. 6A, the coolant pipes LN6 and LN7 are disposed so as to extend toward the rear side in the front-rear direction of the vehicle 1 from portions connected to the damper case 11a. The coolant pipe LN6 and the coolant pipe LN7 are disposed so as to line up in the up-down direction of the vehicle 1.

Figure 7:
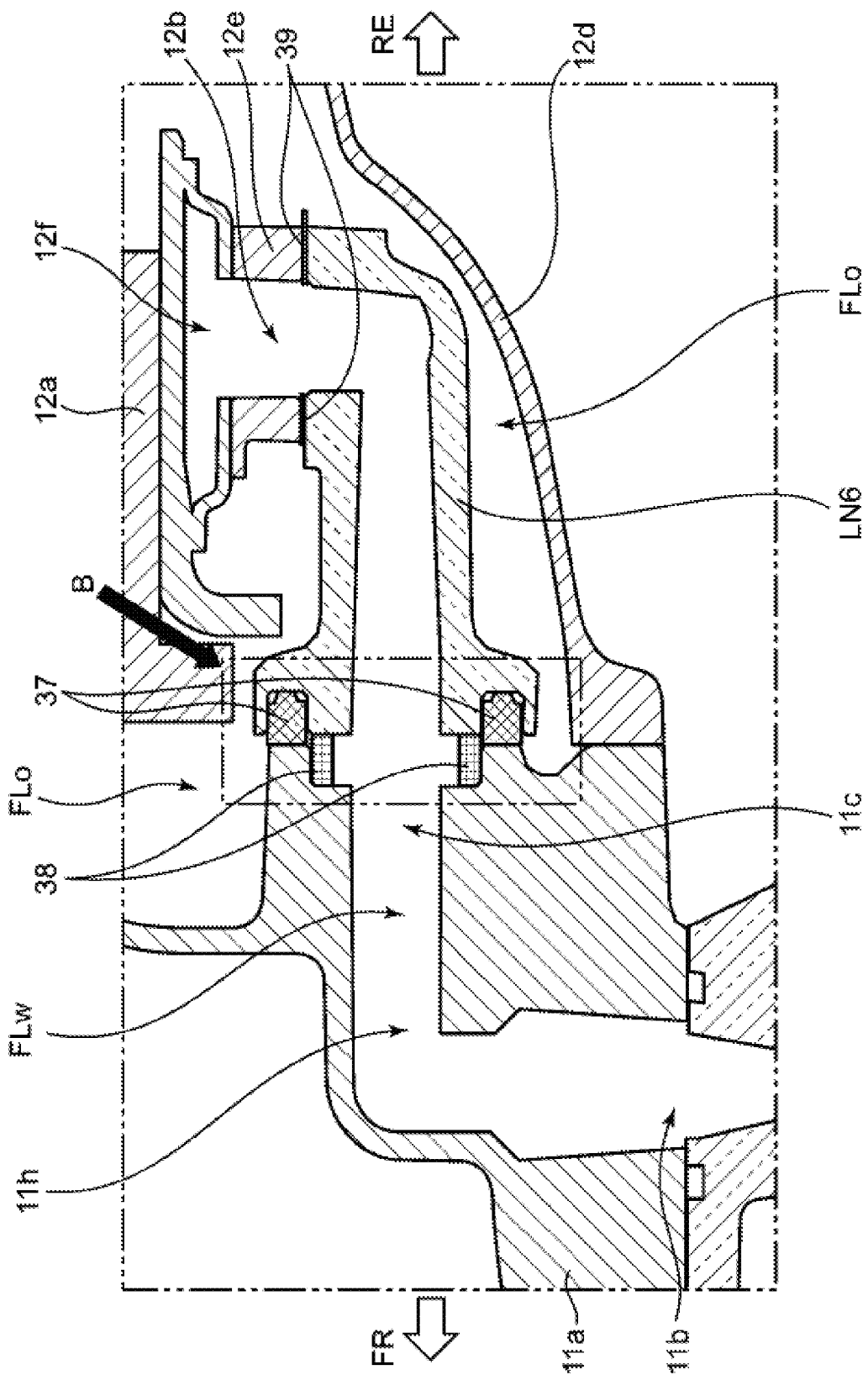
FIG. 7 is a cross-sectional view illustrating a cross section taken along line VII-VII in FIG. 4.

Note that, as illustrated in FIG. 7, the motor case 12a includes a cover 12d that covers a side in the vehicle width direction. The lubricant oil of the motor 12 is accommodated so as to be able to circulate through an oil passage FLo in the cover 12d. The entirety of the coolant pipes LN6 and LN7 (only the coolant pipe LN6 is illustrated in FIG. 7) is also accommodated in the cover 12d. In FIG. 6A, the motor case 12a is illustrated in a state in which the cover 12d is removed.

As illustrated in FIG. 6A and FIG. 6B, the connection between the coolant pipes LN6 and LN7 and the motor case 12a is performed by fastening of bolts 35 and 36. As illustrated in FIG. 7, the coolant pipes LN6 and LN7 (only the coolant pipe LN6 is illustrated in FIG. 7) are connected in a state in which an end surface butts against a connection flange portion 12e provided in the cover 12d in the motor case 12a.

As illustrated in FIG. 7, in the damper case 11a, the in-damper channel 11h is formed such that a portion from an intermediate portion between the pipe connection portion 11b and the pipe connection portion 11c to the pipe connection portion 11c extends in a direction (first direction) along the front-rear direction of the vehicle 1 in a flow direction of the coolant in the in-damper channel 11h. In a connection portion between the damper case 11a and the coolant pipe LN6, seal members 37 and 38 are interposed between the damper case 11a and the coolant pipe LN6. In other words, in the connection between the damper case 11a and the coolant pipe LN6, a double-seal structure is employed.

Note that, although illustration is omitted in FIG. 7, a double-seal structure is also employed in the connection between the damper case 11a and the coolant pipe LN7. Meanwhile, in the connection between the connection flange portion 12e of the motor case 12a and the coolant pipe LN6, sealing is performed by a seal member 39 that is a gasket. This is because the coolant and the lubricant oil can be separated from each other even when the double-seal structure is not employed because the connection of the coolant pipe LN6 to the connection flange portion 12e is performed by fastening using the bolts 35 and 36 as described with reference to FIG. 6A.

As above, the in-damper channel 11h and the in-motor channel 12f are connected to each other by the coolant pipe LN6, and a part of the coolant flow passage FLo is configured.

Note that, although illustration is omitted in FIG. 7, the connection between the damper case 11a and the coolant pipe LN7 is also performed by the same structure.

5. Details of Connection Form Between Damper Case 11a and Coolant Pipes LN6 and LN7

Details of a connection form between the damper case 11a and the coolant pipes LN6 and LN7 are described with reference to FIG. 8 and FIG. 9. Note that, although only the connection portion between the damper case 11a and the coolant pipe LN6 is illustrated and the illustration of the connection portion between the damper case 11a and the coolant pipe LN7 is omitted in FIG. 8 as well, the connection portion between the damper case 11a and the coolant pipe LN7 has the same structure as the connection portion between the damper case 11a and the coolant pipe LN6 illustrated in FIG. 8.

Figure 8:
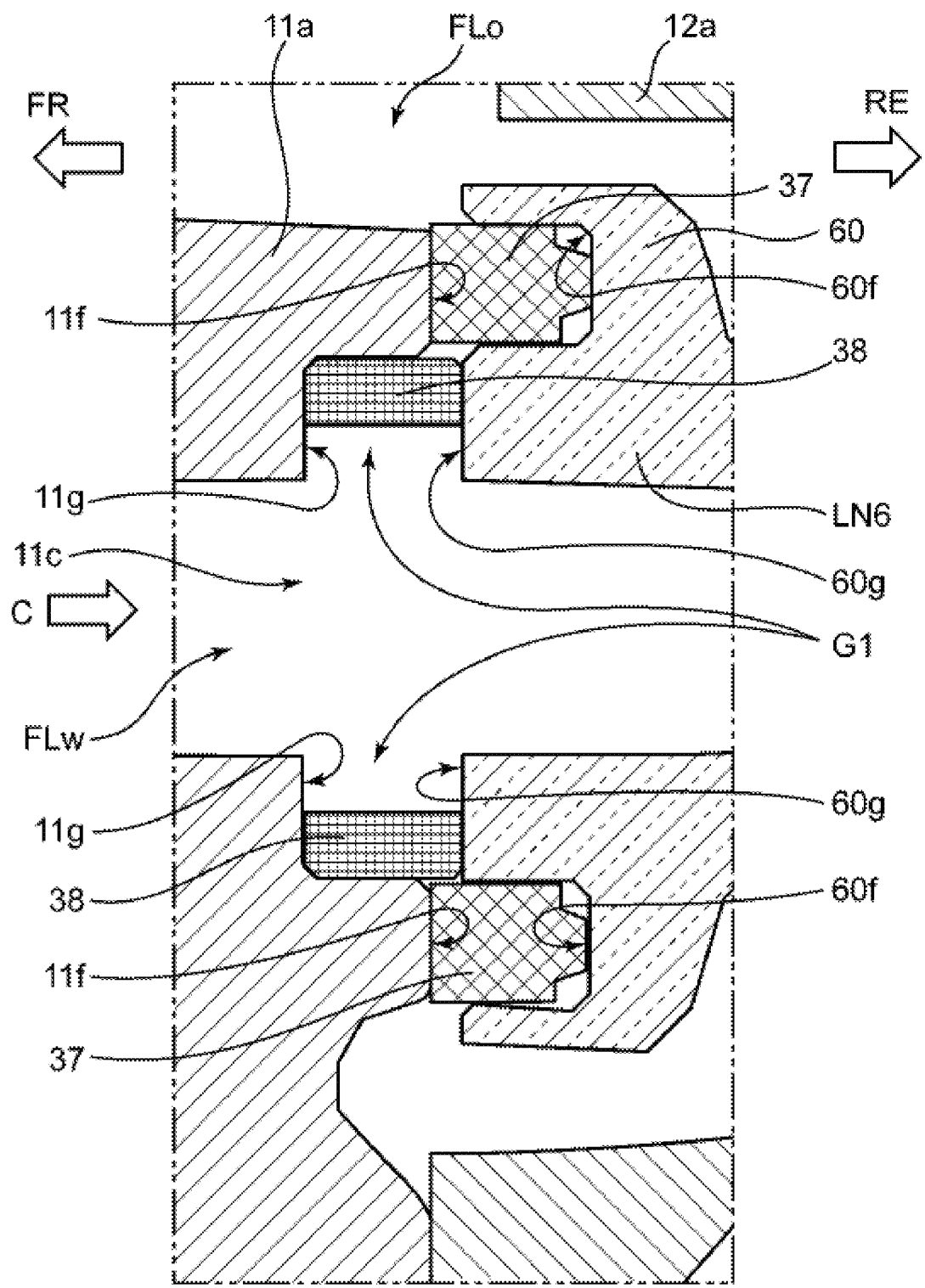
FIG. 8 is a cross-sectional view illustrating part B of FIG. 7 in an enlarged manner.

As illustrated in FIG. 8, in a connection portion between the pipe connection portion (coolant outlet) 11c of the damper case 11a and the coolant pipe LN6, an end surface 11f of the pipe connection portion 11c and an end surface 60g of a pipe member 60 configuring the coolant pipe LN6 face each other in the front-rear direction of the vehicle 1. Note that in this embodiment, the end surface 60g of the pipe member 60 corresponds to a first end surface, and the end surface 11f of the pipe connection portion 11c corresponds to a second end surface.

In the end surface 11f of the damper case 11a, a ring-shaped recess 11g that is recessed toward the front side in the front-rear direction of the vehicle 1 as compared to another portion of the end surface 11f is formed. Meanwhile, in the end surface 60g of the pipe member 60, a ring-shaped recess (groove portion) 60f recessed toward the rear side in the front-rear direction of the vehicle 1 as compared to another portion of the end surface 60g is formed.

A bottom surface of the recess 11g provided in the end surface 11f of the damper case 11a faces a portion (the abovementioned other portion) in the end surface 60g of the pipe member 60 in which the groove portion 60f is not provided, and a bottom surface of the groove portion 60f provided in the end surface 60g of the pipe member 60 faces a portion (the abovementioned other portion) in the end surface 11f of the damper case 11a in which the recess 11g is not provided.

In this embodiment, the recess 11g in the end surface 11f of the damper case 11a is provided on the inner side in the opening radial direction of the pipe connection portion 11c. The groove portion 60f in the end surface 60g of the pipe member 60 is provided on the outer side in the radial direction of the pipe member 60.

The seal member (first seal member) 37 is fitted in the groove portion 60f in the pipe member 60 and a part thereof protrudes to the front side in the front-rear direction of the vehicle 1. As a result, the seal member 37 is in pressure-contact with the bottom surface of the groove portion 60f of the pipe member 60 and the end surface 11f (the abovementioned other portion excluding the recess 11g) of the damper case 11a.

The seal member (second seal member) 38 is fitted in the recess 11g of the damper case 11a, and a part thereof protrudes to the rear side in the front-rear direction of the vehicle 1. As a result, the seal member 38 is in pressure-contact with a bottom surface of the recess 11g in the end surface 11f of the damper case 11a and the end surface 60g (the abovementioned other portion excluding the groove portion 60f) of the pipe member 60.

In a cross section illustrated in FIG. 8, a gap G1 between the end surface 11f of the damper case 11a and the end surface 60g of the pipe member 60 is configured in a crank shape. In other words, in the end surface 11f of the damper case 11a, a difference in level is provided between the bottom surface of the recess 11g and the abovementioned other portion in the end surface 11f excluding the recess 11g. Similarly, in the end surface 60g of the pipe member 60, a difference in level is provided between the bottom surface of the groove portion 60f and the abovementioned other portion in the end surface 60g excluding the groove portion 60f.

Figure 9:
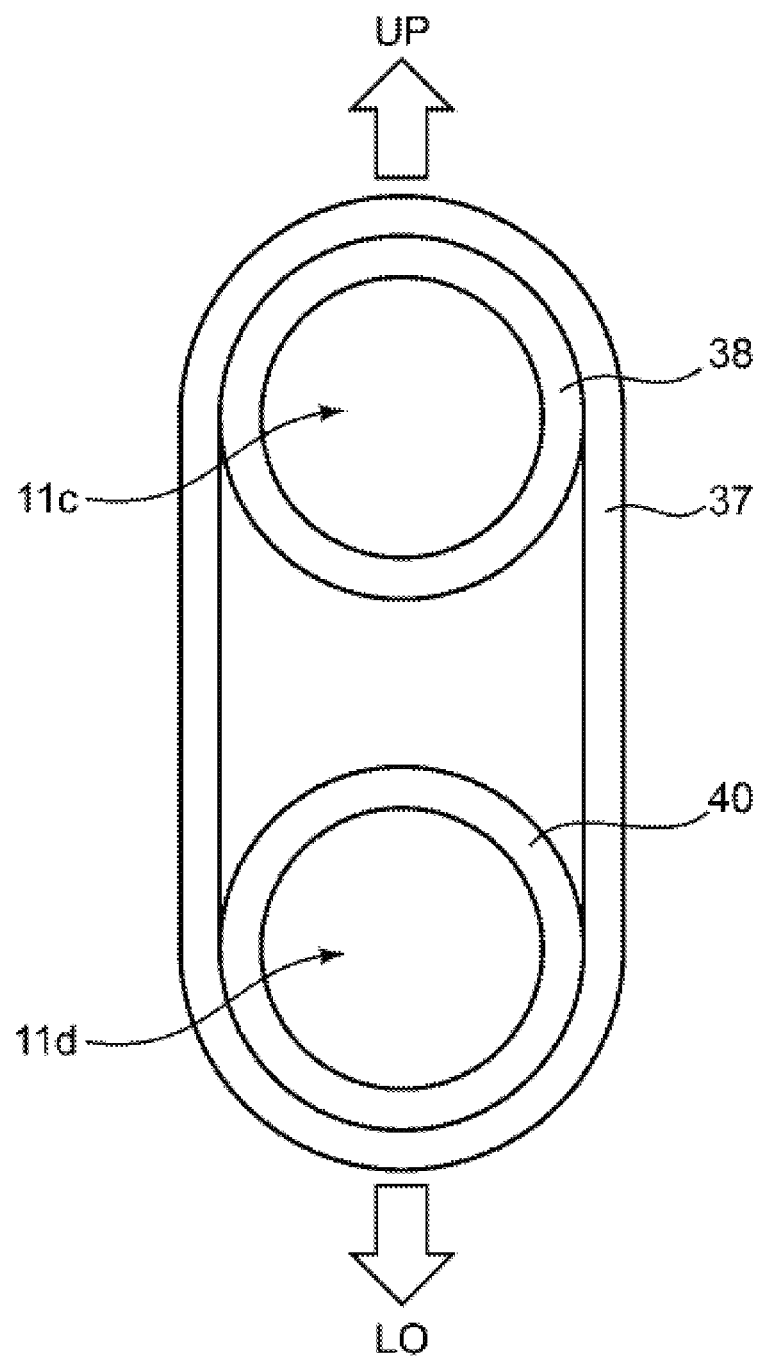
FIG. 9 is a plan view of seal members seen from the direction of arrow C in FIG. 8.

As illustrated in FIG. 9, in a connection portion between the damper case 11a and the coolant pipes LN6 and LN7, the seal member 37 serving as a first seal member and the seal members 38 and 40 serving as second seal members are provided. The seal member 37 is disposed around an opening of the pipe connection portion (coolant outlet) 11c to which the coolant pipe LN6 is connected, and the seal member 40 is disposed around an opening of the pipe connection portion (coolant inlet) 11d to which the coolant pipe LN7 is connected.

The seal member 37 has a substantially oval ring-like shape in plan view. A part of the inner circumference of the seal member 37 abuts against or is adjacent to a part of each of the outer circumferences of the seal members 38 and 40.

Note that in this embodiment, the seal member 37 does not exist in a region between the seal member 38 and the seal member 40 in the up-down direction of the vehicle 1. This is because, as illustrated in FIG. 6A, the coolant pipe LN6 and the coolant pipe LN7 are continuous with each other in the portion connected to the damper case 11a. Therefore, when a structure in which the coolant pipe LN6 and the coolant pipe LN7 are not continuous with each other in the portion connected to the damper case 11a is employed, it is desired that the seal member 37 be interposed in the region between the seal member 38 and the seal member 40 in the up-down direction of the vehicle 1 from the viewpoint of ensuring high sealing property.

6. Assembly of Motor 12 to Damper 11

In this embodiment, the assembly of the motor 12 to the damper 11 is performed as follows.

(Step 1) First, the coolant pipes LN6 and LN7 (pipe member 60) are mounted on the motor case 12a. Specifically, each of the coolant pipes LN6 and LN7 and the connection portion 12e of the motor case 12a are caused to abut against each other in a state in which the seal member 39 is interposed therebetween, and mounting is performed by indicating the bolts 35 and 36.

(Step 2) Next, the seal member (first seal member) 37 is fitted in the groove portion 60f formed in the end surface 60g of the coolant pipes LN6 and LN7 (pipe member 60), and the seal members (second seal members) 38 and 40 are fitted in the recesses 11g (a recess formed in the end surface of the pipe connection portion 11d is not shown) formed in the end surfaces 11f (an end surface of the pipe connection portion 11d is not shown) of the pipe connection portions 11c and 11d.

(Step 3) Next, the motor case 12a on which the coolant pipes LN6 and LN7 are mounted is mounted on the damper case 11a. At the time of the mounting, the pipe connection portions 11c and 11d of the damper case 11a and the end surfaces 11c of the coolant pipes LN6 and LN7 are pressed across the seal members 37, 38, and 40.

Note that in the mounting of the motor case 12a to the damper case 11a, positioning in the circumferential direction and the radial direction is performed with use of a positioning pin before the fastening. Therefore, the positions of each opening of the pipe connection portions 11c and 11d in the damper case 11a and each opening of the coolant pipes LN6 and LN7 match with each other. As a result, the occurrence of defective sealing is suppressed.

When a method of causing the positions of the openings to match with each other in advance with use of a meaning determining pin is not employed as in this embodiment, the pipe connection portions of the damper case and the coolant pipes need to be pressed in a state in which the seal members are interposed therebetween and position adjustment needs to be performed in the circumferential direction or the radial direction in the state. In this case, the seal members interposed in between is rubbed against seal surfaces of the coolant pipes and the pipe connection portions, and there is a fear of a decrease in the sealing property.

7. Effects

The vehicle 1 according to this embodiment is configured such that the coolant is introduced into the motor case 12a from the in-damper channel 11h of the damper case 11a through the coolant pipe LN6. The coolant that has circulated in the motor case 12a is introduced into the damper case 11a from the in-motor channel 12f through the coolant pipe LN7. Therefore, as compared to a case where the coolant is directly placed into and out from the motor case 12a in the motor 12, an increase in the size of the motor 12 in the vehicle width direction can be suppressed.

In the vehicle 1 according to this embodiment, in the connection portion between the coolant pipes LN6 and LN7 and the pipe connection portions 11c and 11d in the damper case 11a, the recesses 11g are provided in the end surface 11f of the damper case 11a, and the groove portion 60f is provided in the end surface 60g of the pipe member 60. The seal member 37 is disposed in a portion at which the bottom surface of the groove portion 60f and the end surface 11f of the damper case 11a face each other, and the seal members 38 and 40 are disposed in portions at which the bottom surfaces of the recesses 11g and the end surface 60g of the pipe member 60 face each other. Therefore, a high sealing property can be ensured even when no partition wall is provided between the portion in which the seal member (first seal member) 37 is disposed and the portions in which the seal members (second seal members) 38 and 40 are disposed.

Therefore, in the vehicle 1 according to this embodiment, the size of the connection portion between the damper case 11a and the coolant pipes LN6 and LN7 in the vehicle width direction can be reduced, a large indoor space can be realized, and high collision safety can be ensured.

In the vehicle 1 according to this embodiment, the groove portion 60f is formed in the end surface 60g of the pipe member 60, and hence the seal member (first seal member) 37 inserted in the groove portion 60f is securely held in the radial direction of the coolant pipes LN6 and LN7. Therefore, a case where the seal member 37 is deformed or moved in the vehicle width direction can be suppressed even when hydraulic pressure from the coolant is applied to the seal member 37.

In the vehicle 1 according to this embodiment, as illustrated in FIG. 8, the gap G1 between the end surface 11f of the damper case 11a and the end surface 60g of the pipe member 60 has a crank shape in cross section, and hence a high sealing property can be ensured even when no partition wall is provided between the portion in which the seal member (first seal member) 37 is disposed and the portions in which the seal members (second seal members) 38 and 40 are disposed.

In the vehicle 1 according to this embodiment, in the connection portion between the pipe connection portions 11c and 11d in the damper case 11a and the coolant pipes LN6 and LN7, a difference in level is provided between the portion in which the seal member (first seal member) 37 is disposed and the portions in which the seal members (second seal members) 38 and 40 are disposed as illustrated in FIG. 8, and hence a high sealing property can be ensured even when no partition wall is provided between the portion in which the seal member 37 is disposed and the portions in which the seal members 38 and 40 are disposed.

In the vehicle 1 according to this embodiment, the inverter 27 is mounted on the upper portion of the transmission case 13a, and the terminal block (electrical connection portion) 29 is mounted on a portion from the upper portion of the transmission case 13a to the upper portion of the motor case 12a. The connection portion between the pipe connection portions 11c and 11d in the damper case 11a and the coolant pipes LN6 and LN7 is provided on the left side with respect to the damper case 11a in the vehicle width direction. Therefore, interference between the connection portion and each of the inverter 27 and the terminal block 29 can be avoided.

In the vehicle 1 according to this embodiment, the exhaust pipe 30 is disposed on the right side with respect to the damper case 11a in the vehicle width direction, and the connection portion is provided on the left side of the damper case 11a in the vehicle width direction. Therefore, interference between the exhaust pipe 30 and the connection portion can be avoided.

In the vehicle 1 according to this embodiment, the entirety of the coolant pipes LN6 and LN7 is accommodated in the cover 12d of the motor case 12a, and hence the coolant pipes LN6 and LN7 do not stick out to the side of the motor case 12a in the vehicle width direction. Therefore, it is effective for keeping the size of the motor case 12a in the vehicle width direction to be small.

As above, in the vehicle 1 according to this embodiment, the size of the connection portion between the damper case 11a and the coolant pipes LN6 and LN7 in the vehicle width direction can be reduced in the structure that guides the coolant between the damper case 11a and the motor case 12a, a large indoor space can be realized, and high collision safety can be ensured.

[Modification 1]

A vehicle according to Modification 1 is described with reference to FIG. 10A. Note that the difference of the vehicle according to this modification from the abovementioned embodiment is the structure of an end surface 61g of a damper case 61a and the structure of an end surface 62f of a pipe member 62 configuring a coolant pipe LN62. Description is made below by focusing on the difference.

Figure 10A:
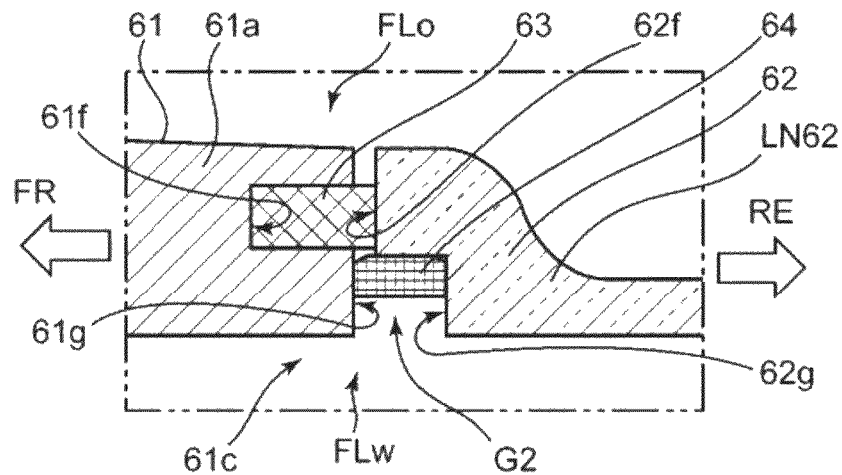
FIG. 10A is a cross-sectional view illustrating a seal structure between a damper case and a cooling water pipe according to Modification 1.

As illustrated in FIG. 10A, in a connection portion between a pipe connection portion (coolant outlet) 61c of the damper case 61a and the coolant pipe LN62, the end surface 61g of the pipe connection portion 61c and the end surface 62f of the pipe member 62 configuring the coolant pipe LN62 face each other in the front-rear direction of the vehicle. In this modification, the end surface 61g of the pipe connection portion 61c corresponds to the first end surface, and the end surface 62f of the pipe member 62 corresponds to the second end surface.

In the end surface 61g of the damper case 61a, a ring-shaped recess (groove portion) 61f that is recessed toward the front side in the front-rear direction of the vehicle as compared to another portion of the end surface 61g is formed. Meanwhile, in the end surface 60f of the pipe member 62, a ring-shaped recess 60g that is recessed toward the rear side in the front-rear direction of the vehicle as compared to another portion of the end surface 62f is formed.

A bottom surface of the groove portion 61f provided in the end surface 61g of the damper case 61a faces a portion (the abovementioned other portion) in the end surface 62f of the pipe member 62 in which the recess 62g is not provided, and a bottom surface of the recess 62g provided in the end surface 62f of the pipe member 62 faces a portion (the abovementioned other portion) in the end surface 61g of the damper case 61a in which the groove portion 61f is not provided.

In this modification, the groove portion 61f in the end surface 61g of the damper case 61a is provided on the outer side in the opening radial direction of the pipe connection portion 61c. The recess 62g in the end surface 62f of the pipe member 62 is provided on the inner side in the radial direction of the pipe member 62.

A seal member (first seal member) 63 is fitted in the groove portion 61f in the damper case 61a, and a part thereof protrudes to the rear side in the front-rear direction of the vehicle. As a result, the seal member 63 is in pressure-contact with the bottom surface of the groove portion 61f in the end surface 61g of the damper case 61a and the end surface 62f (the abovementioned other portion excluding the recess 62g) of the pipe member 62.

A seal member (second seal member) 64 is fitted in the recess 62g in the pipe member 62, and a part thereof protrudes to the front side in the front-rear direction of the vehicle. As a result, the seal member 64 is in pressure-contact with the bottom surface of the recess 62g in the pipe member 62 and the end surface 61g (the abovementioned other portion excluding the groove portion 61f) of the damper case 61a.

In a cross section illustrated in FIG. 10A, a gap G2 between the end surface 61g of the damper case 61a and the end surface 62f of the pipe member 62 is also configured in a crank shape as with the abovementioned embodiment. In the end surface 61g of the damper case 61a, a difference in level is provided between the bottom surface of the groove portion 61f and the abovementioned other portion in the end surface 61g excluding the groove portion 61f. Similarly, in the end surface 62f of the pipe member 62, a difference in level is provided between the bottom surface of the recess 62g and the abovementioned other portion in the end surface 62f excluding the recess 62g.

Effects similar to those in the abovementioned embodiment can also be obtained in the vehicle according to this modification.

[Modification 2]

A vehicle according to Modification 2 is described with reference to FIG. 10B. Note that the difference of the vehicle according to this modification from the abovementioned embodiment is the structure of an end surface 65g of a damper case 65a and the structure of an end surface 66f of a pipe member 66 configuring a coolant pipe LN66. Description is made below by focusing on the difference.

Figure 10B:
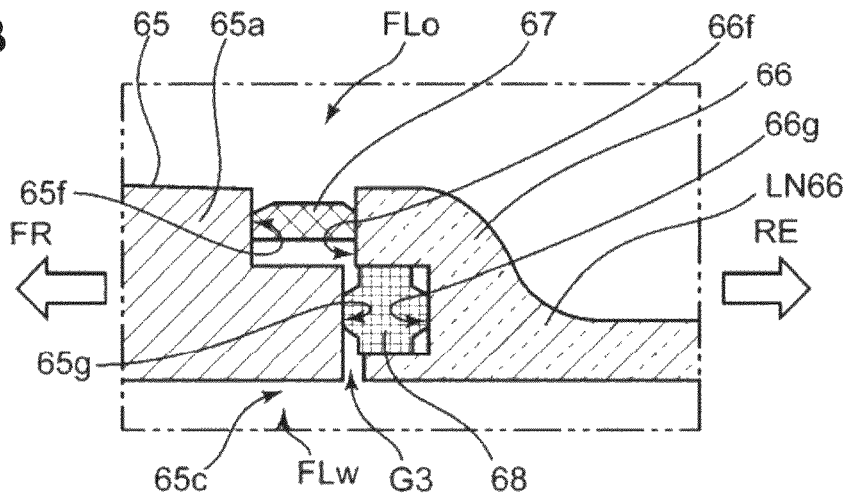
FIG. 10B is a cross-sectional view illustrating a seal structure between a damper case and a cooling water pipe according to Modification 2.

As illustrated in FIG. 10B, in a connection portion between a pipe connection portion (coolant outlet) 65c of the damper case 65a and the coolant pipe LN66, the end surface 65g of the pipe connection portion 65c and the end surface 66f of the pipe member 66 configuring the coolant pipe LN66 face each other in the front-rear direction of the vehicle. In this modification, the end surface 65g of the pipe connection portion 65c corresponds to the first end surface, and the end surface 66f of the pipe member 66 corresponds to the second end surface.

In the end surface 65g of the damper case 65a, a ring-shaped recess 65f that is recessed toward the front side in the front-rear direction of the vehicle as compared to another portion of the end surface 65g is formed. Meanwhile, in the end surface 66f of the pipe member 66, a ring-shaped recess (groove portion) 66g that is recessed toward the rear side in the front-rear direction of the vehicle as compared to another portion of the end surface 66f is formed.

A bottom surface of the recess 65f provided in the end surface 65g of the damper case 65a faces a portion (the abovementioned other portion) in the end surface 66f of the pipe member 66 in which the groove portion 66g is not provided, and a bottom surface of the groove portion 66g provided in the end surface 66f of the pipe member 66 faces a portion (the abovementioned other portion) in the end surface 65g of the damper case 65a in which the recess 65f is not provided.

In this modification, the recess 65f in the end surface 65g of the damper case 65a is provided on the outer side in the opening radial direction of the pipe connection portion 65c. The groove portion 66g in the end surface 66f of the pipe member 66 is provided on the inner side in the radial direction of the pipe member 66.

A seal member (first seal member) 67 is fitted in the recess 65f in the damper case 65a, and a part thereof protrudes to the rear side in the front-rear direction of the vehicle. As a result, the seal member 67 is in pressure-contact with the bottom surface of the recess 65f in the end surface 65g of the damper case 65a and the end surface 66f (the abovementioned other portion excluding the groove portion 66g) of the pipe member 66.

A seal member (second seal member) 68 is fitted in the groove portion 66g in the pipe member 66, and a part thereof protrudes to the front side in the front-rear direction of the vehicle. As a result, the seal member 68 is in pressure-contact with the bottom surface of the groove portion 66g in the pipe member 66 and the end surface 65g (the abovementioned other portion excluding the recess 65f) of the damper case 65a.

In a cross section illustrated in FIG. 10B, a gap G3 between the end surface 65g of the damper case 65a and the end surface 66f of the pipe member 66 is also configured in a crank shape as with the abovementioned embodiment. In the end surface 65g of the damper case 65a, a difference in level is provided between the bottom surface of the recess 65f and the abovementioned other portion in the end surface 65g excluding the recess 65f. Similarly, in the end surface 66f of the pipe member 66, a difference in level is provided between the bottom surface of the groove portion 66g and the abovementioned other portion in the end surface 66f excluding the groove portion 66g.

Effects similar to those in the abovementioned embodiment can also be obtained in the vehicle according to this modification.

[Modification 3]

A vehicle according to Modification 3 is described with reference to FIG. 10C. Note that the difference of the vehicle according to this modification from the abovementioned embodiment is the structure of an end surface 69f of a damper case 69a and the structure of an end surface 70g of a pipe member 70 configuring a coolant pipe LN70. Description is made below by focusing on the difference.

Figure 10C:
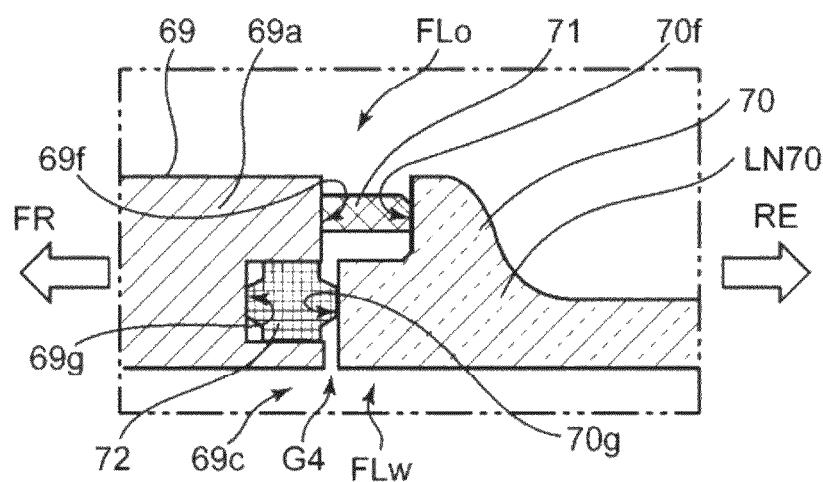
FIG. 10C is a cross-sectional view illustrating a seal structure between a damper case and a cooling water pipe according to Modification 3.

As illustrated in FIG. 10C, in a connection portion between a pipe connection portion (coolant outlet) 69c of the damper case 69a and the coolant pipe LN70, the end surface 69f of the pipe connection portion 69c and the end surface 70g of the pipe member 70 configuring the coolant pipe LN70 face each other in the front-rear direction of the vehicle. In this modification, the end surface 70g of the pipe member 70 corresponds to the first end surface, and the end surface 69f of the pipe connection portion 69c corresponds to the second end surface.

In the end surface 69f of the damper case 69a, a ring-shaped recess (groove portion) 69g that is recessed toward the front side in the front-rear direction of the vehicle as compared to another portion of the end surface 69f is formed. Meanwhile, in the end surface 70g of the pipe member 70, a ring-shaped recess 70f that is recessed toward the rear side in the front-rear direction of the vehicle as compared to another portion of the end surface 70g is formed.

A bottom surface of the groove portion 69g provided in the end surface 69f of the damper case 69a faces a portion (the abovementioned other portion) in the end surface 70g of the pipe member 70 in which the recess 70f is not provided, and a bottom surface of the recess 70f provided in the end surface 70g of the pipe member 70 faces a portion (the abovementioned other portion) in the end surface 69f of the damper case 69a in which the groove portion 69g is not provided.

In this modification, the groove portion 69g in the end surface 69f of the damper case 69a is provided on the inner side in the opening radial direction of the pipe connection portion 69c. The recess 70f in the end surface 70g of the pipe member 70 is provided on the outer side in the radial direction of the pipe member 70.

A seal member (first seal member) 71 is fitted in the groove portion 69g in the damper case 69a, and a part thereof protrudes to the rear side in the front-rear direction of the vehicle. As a result, the seal member 71 is in pressure-contact with the bottom surface of the groove portion 69$g$ in the end surface 69$f$ of the damper case 69$a$ and the end surface 70$g$ (the abovementioned other portion excluding the recess 70$f$) of the pipe member 70.

A seal member (second seal member) 72 is fitted in the recess 70$f$ in the pipe member 70, and a part thereof protrudes to the front side in the front-rear direction of the vehicle. As a result, the seal member 72 is in pressure-contact with the bottom surface of the recess 70$f$ in the pipe member 70 and the end surface 69$f$ (the abovementioned other portion excluding the groove portion 69$g$) of the damper case 69$a$.

In a cross section illustrated in FIG. 10C, a gap G4 between the end surface 69$f$ of the damper case 69$a$ and the end surface 70$g$ of the pipe member 70 is also configured in a crank shape as with the abovementioned embodiment. In the end surface 69$f$ of the damper case 69$a$, a difference in level is provided between the bottom surface of the groove portion 69$g$ and the abovementioned other portion in the end surface 69$f$ excluding the groove portion 69$g$. Similarly, in the end surface 70$g$ of the pipe member 70, a difference in level is provided between the bottom surface of the recess 70$f$ and the abovementioned other portion in the end surface 70$g$ excluding the recess 70$f$.

Effects similar to those in the abovementioned embodiment can also be obtained in the vehicle according to this modification.

Conclusion

In the abovementioned embodiment and Modifications 1 to 3 described above, the recesses 11$g$, 62$g$, 65$f$, and 70$f$ are provided in one (first end surface) of the end surfaces 11$g$, 61$g$, 65$g$, and 69$f$ of the damper cases 11, 61, 65, and 69 and the end surfaces 60$g$, 62$f$, 66$f$, and 70$g$ of the pipe members 60, 62, 66, and 70, and the groove portions 60$f$, 61$f$, 66$g$, and 69$g$ are provided in the other (second end surface) thereof. In the abovementioned embodiment and Modifications 1 to 3 described above, a form having side walls on both of the inner side and the outer side in the opening radial direction of the pipe members 60, 62, 66, and 70 is referred to as the "groove portion", and a form that has a side wall on one of the inner side and the outer side and does not have a side wall on the other side is referred to as the "recess".

Note that in the abovementioned embodiment and Modifications 1 to 3 described above, by providing the recesses 11$g$, 62$g$, 65$f$, and 70$f$ in the end surfaces 11$f$, 62$f$, 65$g$, and 70$g$, a difference in level is formed between portions in which the recesses 11$g$, 62$g$, 65$f$, and 70$f$ are provided and portions in which the recesses are not provided.

As illustrated in FIG. 8 to FIG. 10, the seal members (first seal members) 37, 63, 68, and 71 and the seal members (second seal members) 38, 40, 64, 68, and 72 are disposed so as to be adjacent to each other in the opening radial direction of the pipe members 60, 62, 66, and 70 (double-seal structure). As a result, in the abovementioned embodiment and Modifications 1 to 3 described above, a high sealing property can be ensured between the damper cases 11$a$, 61$a$, 65$a$, and 69$a$ and the coolant pipes LN6, LN7, LN62, LN66, and LN70 (pipe members 60, 62, 66, and 70).

Note that when the groove portion is provided in the end surface, side walls exist on both of the inner side and the outer side in the opening radial direction of the pipe member, and hence there is an advantage in terms of ensuring the sealing property.

Meanwhile, when the recess (difference in level) is provided in the end surface, there are no side walls on one of the inner side and the outer side in the opening radial direction of the pipe member, and hence there is an advantage in terms of weight saving and downsizing.

Other Modifications

In the abovementioned embodiment and Modifications 1 to 3 described above, a four-cylinder engine has been employed as the engine 10 as one example, but the present disclosure is not limited thereto. For example, an engine with five or more cylinders, a V-type multi-cylinder engine, and a W-type multi-cylinder engine can also be employed.

In the abovementioned embodiment and Modifications 1 to 3 described above, a four-wheel-drive vehicle that transmits a driving force generated in the engine 10 and the motor 12 also to the front wheels 23 and 24 has been given as one example, but the present disclosure is not limited thereto. For example, application to an FR vehicle (front engine, rear drive) is also possible.

Various dampers employed for a hybrid vehicle can be used as the dampers 11, 61, 65, and 69 in the abovementioned embodiment and Modifications 1 to 3 described above. For example, a damper with a limiter having a function of slipping when a predetermined torque is exceeded can also be employed.

In the abovementioned embodiment and Modifications 1 to 3 described above, a radiator provided in order to cool the coolant of the engine 10 is used as the radiator 33 in the coolant route in a shared manner, but the present disclosure is not limited thereto. A radiator separate from the radiator for cooling the coolant of the engine 10 may be provided.

In the abovementioned embodiment and Modifications 1 to 3 described above, water is employed as one example of the coolant for cooling the motor 12, but the present disclosure is not limited thereto. For example, oil of a type that is different from that of the lubricant oil in the motor case 12$a$ can also be used.

REFERENCE SIGNS LIST

1 Vehicle
1$d$ Floor tunnel
10 Engine (longitudinal engine)
11, 61, 65, 69 Damper
11$a$, 61$a$, 65$a$, 69$a$ Damper case
11$b$ to 11$e$, 61$c$, 65$c$, 69$c$ Pipe connection portion
12 Motor
12$a$ Motor case
12$b$, 12$c$ Pipe connection portion
12$d$ Cover
37, 63, 67, 71 Seal member (first seal member)
38, 40, 64, 68, 72 Seal member (second seal member)
60, 62, 66, 70 Pipe member
LN6, LN7, LN62, LN66, LN70 Cooling water pipe

The invention claimed is:

1. A vehicle, comprising:
  a longitudinal engine having cylinders, the cylinders arranged in a vehicle front-rear direction;
  a motor disposed on a rear side with respect to the longitudinal engine in the vehicle front-rear direction and to generate a driving force for vehicle traveling;
  a damper that is provided between the longitudinal engine and the motor in the vehicle front-rear direction, and the damper mitigates an impact torque between the longitudinal engine and the motor; and a coolant channel for causing coolant for cooling the motor to circulate in the motor, wherein
the damper includes a damper case,
the motor includes a motor case that accommodates a rotor, a stator, and lubricant oil,
the coolant channel includes:
   an in-damper channel for circulating the coolant in the damper case;
   an in-motor channel for circulating the coolant in the motor case; and
   a coolant pipe that connects a coolant outlet in the in-damper channel and a coolant inlet in the in-motor channel to each other in the motor case,
the in-damper channel is provided such that a predetermined region of the in-damper channel leading to the coolant outlet extends in a first direction along the vehicle front-rear direction,
a pipe end surface of the coolant pipe and an outlet end surface of the coolant outlet face each other in a connection portion between the coolant pipe and the coolant outlet,
a first seal member and a second seal member, which are each provided in a ring shape so as to surround the coolant channel and of which diameters of the first seal member and the second seal member are different from each other, are interposed in a liquid-tight manner between the pipe end surface and the outlet end surface in the first direction,
a first end surface that is one of the pipe end surface and the outlet end surface has a first recess having a ring shape and recessed toward the first direction as compared to another portion of the first end surface, and a second end surface that is the other of the pipe end surface and the outlet end surface has, in a portion on an inner side with respect to the first recess, a second recess having a ring shape,
the first seal member seals a bottom surface of the first recess and another portion of the second end surface to each other in a liquid-tight manner, and
the second seal member seals a bottom surface of the second recess and the other portion of the first end surface to each other in a liquid-tight manner.

2. The vehicle according to claim 1, wherein, when a direction orthogonal to the first direction is a second direction, at least one of the first recess and the second recess is a groove portion having two side surfaces facing each other in the second direction and the bottom surface when the connection portion between the coolant pipe and the coolant outlet is cross-sectionally viewed in a cross-section along the first direction.

3. The vehicle according to claim 2, wherein a gap is located between the pipe end surface and the outlet end surface when the connection portion between the coolant pipe and the coolant outlet is cross-sectionally viewed in the cross-section along the first direction.

4. The vehicle according to claim 3, wherein:
the first end surface has a height difference between the first recess and the other portion in the first end surface; and
the second end surface has a height difference between the second recess and the other portion in the second end surface.

5. The vehicle according to claim 4, further comprising:
a transmission that includes a transmission structure and a transmission case accommodating the transmission structure, is disposed so as to be adjacent to the motor on a rear side with respect to the motor in the vehicle front-rear direction, and is coupled to the motor; and
an inverter that converts input direct-current power to alternating-current power and outputs the alternating-current power to the motor, wherein
a floor tunnel that bulges out toward an inside of a vehicle cabin and extends in the vehicle front-rear direction is formed in a floor panel of the vehicle,
the transmission is disposed on a lower side of the floor tunnel, and
the inverter is mounted on the lower side of the floor tunnel and on an upper portion of the transmission case.

6. The vehicle according to claim 5, further comprising an exhaust pipe that is connected to the longitudinal engine and guides and exhausts gas from the longitudinal engine to a vehicle rear side, wherein
the exhaust pipe is disposed on one side of the damper case in a vehicle width direction.

7. The vehicle according to claim 6, wherein
the motor case includes a cover that covers a side in the vehicle width direction,
the lubricant oil is accommodated in the cover, and
an entirety of the coolant pipe from the connection portion with respect to the coolant outlet in the in-damper channel to the connection portion with respect to the coolant inlet in the in-motor channel is accommodated in the cover.

8. The vehicle according to claim 1, wherein a gap is located between the pipe end surface and the outlet end surface when the connection portion between the coolant pipe and the coolant outlet is cross-sectionally seen in a cross-section along the first direction.

9. The vehicle according to claim 1, wherein:
the first end surface has a height difference between the first recess and the other portion in the first end surface; and
the second end surface has a height difference between the second recess and the other portion in the second end surface.

10. The vehicle according to claim 1, further comprising:
a transmission that includes a transmission structure and a transmission case accommodating the transmission structure, is disposed so as to be adjacent to the motor on a rear side with respect to the motor in the vehicle front-rear direction, and is coupled to the motor; and
an inverter that converts input direct-current power to alternating-current power and outputs the alternating-current power to the motor, wherein
a floor tunnel that bulges out toward an inside of a vehicle cabin and extends in the vehicle front-rear direction is formed in a floor panel of the vehicle,
the transmission is disposed on a lower side of the floor tunnel, and
the inverter is mounted on the lower side of the floor tunnel and on an upper portion of the transmission case.

11. The vehicle according to claim 1, further comprising an exhaust pipe that is connected to the longitudinal engine and guides and exhausts gas from the longitudinal engine to a vehicle rear side, wherein
the exhaust pipe is disposed on one side of the damper case in a vehicle width direction, and
the connection portion between the coolant pipe and the coolant outlet is provided on a side in the damper case in the vehicle width direction that is on a side opposite to a side on which the exhaust pipe is disposed.

12. The vehicle according to claim 1, wherein
the motor case includes a cover that covers a side in a vehicle width direction,
the lubricant oil is accommodated in the cover, and
an entirety of the coolant pipe from the connection portion with respect to the coolant outlet in the in-damper channel to the connection portion with respect to the coolant inlet in the in-motor channel is accommodated in the cover.

13. The vehicle according to claim 2, wherein:
the first end surface has a height difference between the first recess and the other portion in the first end surface; and
the second end surface has a height difference between the second recess and the other portion in the second end surface.

14. The vehicle according to claim 2, further comprising:
a transmission that includes a transmission structure and a transmission case accommodating the transmission structure, is disposed so as to be adjacent to the motor on a rear side with respect to the motor in the vehicle front-rear direction, and is coupled to the motor; and
an inverter that converts input direct-current power to alternating-current power and outputs the alternating-current power to the motor, wherein
a floor tunnel that bulges out toward an inside of a vehicle cabin and extends in the vehicle front-rear direction is formed in a floor panel of the vehicle,
the transmission is disposed on a lower side of the floor tunnel, and
the inverter is mounted on the lower side of the floor tunnel and on an upper portion of the transmission case.

15. The vehicle according to claim 2, further comprising an exhaust pipe that is connected to the longitudinal engine and guides and exhausts gas from the longitudinal engine to a vehicle rear side, wherein
the exhaust pipe is disposed on one side of the damper case in a vehicle width direction, and
the connection portion between the coolant pipe and the coolant outlet is provided on a side in the damper case in the vehicle width direction that is on a side opposite to a side on which the exhaust pipe is disposed.

16. The vehicle according to claim 2, wherein
the motor case includes a cover that covers a side in a vehicle width direction,
the lubricant oil is accommodated in the cover, and
an entirety of the coolant pipe from the connection portion with respect to the coolant outlet in the in-damper channel to the connection portion with respect to the coolant inlet in the in-motor channel is accommodated in the cover.

17. The vehicle according to claim 3, further comprising:
a transmission that includes a transmission structure and a transmission case accommodating the transmission structure, is disposed so as to be adjacent to the motor on a rear side with respect to the motor in the vehicle front-rear direction, and is coupled to the motor; and
an inverter that converts input direct-current power to alternating-current power and outputs the alternating-current power to the motor, wherein
a floor tunnel that bulges out toward an inside of a vehicle cabin and extends in the vehicle front-rear direction is formed in a floor panel of the vehicle,
the transmission is disposed on a lower side of the floor tunnel, and
the inverter is mounted on the lower side of the floor tunnel and on an upper portion of the transmission case.

18. The vehicle according to claim 3, further comprising an exhaust pipe that is connected to the longitudinal engine and guides and exhausts gas from the longitudinal engine to a vehicle rear side, wherein
the exhaust pipe is disposed on one side of the damper case in a vehicle width direction, and
the connection portion between the coolant pipe and the coolant outlet is provided on a side in the damper case in the vehicle width direction that is on a side opposite to a side on which the exhaust pipe is disposed.

19. The vehicle according to claim 3, wherein
the motor case includes a cover that covers a side in a vehicle width direction,
the lubricant oil is accommodated in the cover, and
an entirety of the coolant pipe from the connection portion with respect to the coolant outlet in the in-damper channel to the connection portion with respect to the coolant inlet in the in-motor channel is accommodated in the cover.

20. The vehicle according to claim 4, further comprising an exhaust pipe that is connected to the longitudinal engine and guides and exhausts gas from the longitudinal engine to a vehicle rear side, wherein
the exhaust pipe is disposed on one side of the damper case in a vehicle width direction, and
the connection portion between the coolant pipe and the coolant outlet is provided on a side portion in the damper case in the vehicle width direction that is on a side opposite to a side on which the exhaust pipe is disposed.

* * * * *